United States Patent [19]

Roberts et al.

[11] 4,320,453
[45] Mar. 16, 1982

[54] DUAL SEQUENCER MICROPROCESSOR

[75] Inventors: William H. Roberts, Corona Del Mar; Paul A. Rutkowski, Mission Viego, both of Calif.

[73] Assignee: Digital House, Ltd., Santa Ana, Calif.

[21] Appl. No.: 957,146

[22] Filed: Nov. 2, 1978

[51] Int. Cl.[3] .......................... G06F 9/22; G06F 9/38
[52] U.S. Cl. ..................................................... 364/200
[58] Field of Search ... 364/200 MS File, 900 MS File; 365/236, 239, 230

[56] References Cited

U.S. PATENT DOCUMENTS

| | | | |
|---|---|---|---|
| 3,651,482 | 3/1972 | Benson et al. | 364/200 |
| 3,689,895 | 9/1972 | Kitamura | 364/200 |
| 3,736,567 | 5/1973 | Lotan et al. | 364/200 |
| 3,771,138 | 11/1973 | Celtruda et al. | 364/200 |
| 4,025,904 | 5/1977 | Adney et al. | 364/200 |
| 4,075,687 | 2/1978 | Nissen et al. | 364/200 |
| 4,156,925 | 5/1979 | Tutt et al. | 364/200 |
| 4,159,520 | 6/1979 | Prioste | 364/200 |
| 4,164,787 | 8/1979 | Aranguren | 364/200 |
| 4,197,579 | 4/1980 | Otis, Jr. et al. | 364/200 |

OTHER PUBLICATIONS

Leininger, J. C. et al., "Conditional Control Store Latch Freeze", IBM Tech. Discl. Bull., vol. 20, No. 3, Aug. 1977, pp. 881–882.

Primary Examiner—Gareth D. Shaw
Assistant Examiner—Thomas M. Heckler
Attorney, Agent, or Firm—Wayne Willenberg

[57] ABSTRACT

A control section consisting of an address processing circuit and two sequencers for use in a programmable microprocessor. The address processing circuit has two sets of input lines and one set of output lines, and is adapted to convert address information provided at the input lines into a signal at the output lines which consists of microinstructions suitable for use in other portions of the microprocessor. Each sequencer is connected to one set of input lines of the address processing circuit and is adapted to receive data from an external source and provide address information corresponding to such data to the address processing circuit. In operation, the signal provided at the output lines of the address processing circuit consists of time-division multiplexed microinstructions, each such microinstruction being derived from one of the two external sources. The utilization of two sequencers in the control section of the present device and the corresponding time-division multiplexed microinstructions enables a microprocessor which utilizes the control section of the present invention to simultaneously control two realtime tasks.

26 Claims, 5 Drawing Figures

DUAL SEQUENCER MICROPROCESSOR

BACKGROUND OF THE INVENTION

1. Field of the Invention

The present invention relates to the field of electronic microprogrammable processors, and more specifically to a control section of such a microprocessor.

2. Prior Art

As microprocessors find more and more applications, situations have developed where two microprocessors are needed to perform a single function. However, it is often not economically feasible to provide two complete and separate microprocessors working in tandem to complete a single task.

An example of such an application where it has been necessary to provide two microprocessors to perform one overall function is in the application of microprocessors to disc controllers operating at high data rates. In this situation one microprocessor has been needed to manage the data flow on the disc side of the disc buffer, while a separate microprocessor has been needed to manage the data flow on the computer side of the disc buffer. However, a single microprocessor often would have the necessary speed to handle both tasks if only the microprocessor could concurrently execute two independent programs, each with subroutine capability. A beneficial result of such a microprocessor would be the elimination of the needless duplication of common components caused by having two complete and separate microprocessors. Thus, in this specific example of the necessity for more than one microprocessor, as well as a variety of other applications, it is clear that there has been required a single microprocessor which is capable of simultaneously handling two realtime tasks.

Accordingly, it is a general object of the present invention to provide an improved control section for a microprocessor.

It is another object of the present invention to provide an improved control section for a microprocessor which allows the microprocessor to simultaneously handle two realtime tasks.

It is another object of the present invention to provide a control section for a microprocessor which allows a microprocessor to simultaneously handle two realtime tasks with high efficiency and minimum latency.

It is yet another object of the present invention to provide a control section for a microprocessor which has a conditional execute capability.

It is still another object of the present invention to provide an improved control section for a microprocessor which has an interrupt capability so as to permit rapid sensing of external conditions so as to control the microprocessor.

SUMMARY OF THE INVENTION

An improved control section for a microprocessor is provided. The control section includes two sequencers connected to an address processing circuit. Each sequencer is adapted to receive data from a separate and independent external source, and in response to such data provide address information to the address processing circuit. The address processing circuit, including a control memory, is adapted to convert the address information provided to it by each of the sequencers into microinstructions corresponding to such data. The microinstructions generated by the address processing circuit are provided to and executed by the data section of the microprocessor. The address processing circuit and the sequencers are configured so as to allow for interlaced address generation by the address processing circuit and accessing of the microinstructions in the control memory. In addition, the address processing circuit and the sequencers and adapted and interconnected so that the microinstructions provided by the address processing circuit are comprised of time-division multiplexed microinstructions, each microinstruction corresponding to data from one of the two external sources. Thus, the present invention, when used in a microprocessor, allows that microprocessor to perform two separate and independent programs and thus simultaneously serve two realtime tasks.

Novel features which are believed to be characteristic of the invention, both as to its organization and its method of operation, together with further objects and advantages thereof, will be better understood from the following description in connection with accompanying drawings in which a presently preferred embodiment of the invention is illustrated by way of example. It is to be expressly understood, however, that the drawings are for purposes of illustration and description only and are not intended as a definition of the limits of the invention.

DETAILED DESCRIPTION OF THE DRAWINGS

Figure 1:
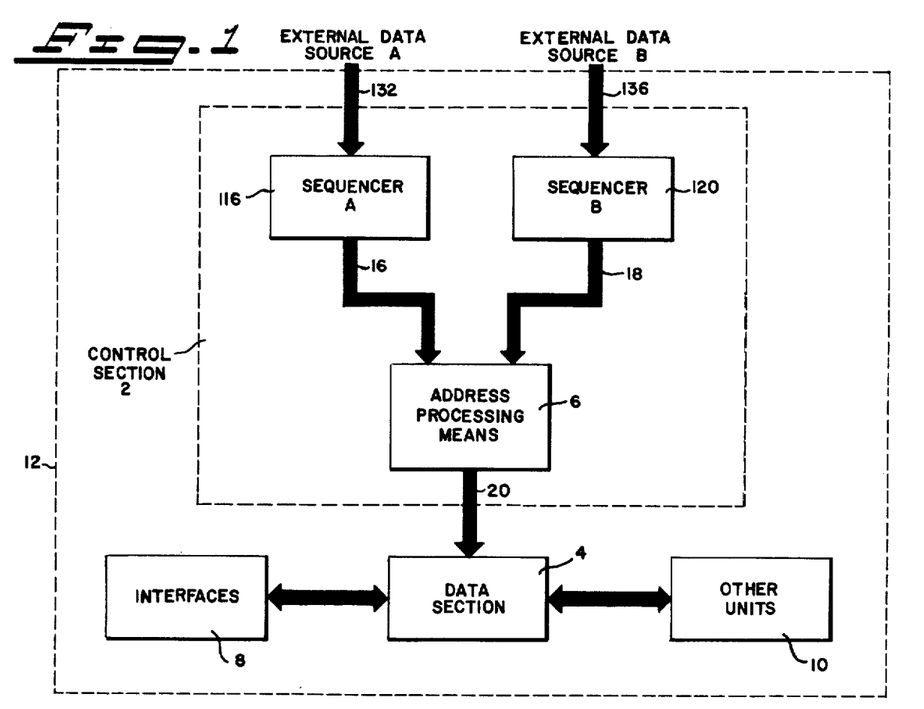
FIG. 1 is a simplified block diagram of a microprocessor which includes the control section of the present invention.

FIG. 1 illustrates the basic components of the control section 2 of the present invention in relation to the other basic components comprising a programmable microprocessor 12. Control section 2 provides microinstructions via output bus 20 to data section 4 of the microprocessor 12 in response to data from two distinct external sources. As will be described more fully hereinbelow, control section 2 is arranged and configured so as to give microprocessor 12 the capability to manage simultaneously two independent microprograms, and thereby simultaneously serve two realtime tasks.

More specifically, control section 2 is comprised of an A sequencer 116 and a B sequencer 120, along with address processing means 6. External data is provided to the A sequencer 116 via input lines 132, while external data is provided to the B sequencer 120 via input lines 136. The sequencers 116, 120 process this external data so as to provide address information responsive to the external data to the address processing means 6 via coupling bus 16 and coupling bus 18. Address processing means 6 converts the address information provided by the coupling buses 16, 18 into a signal at its output bus 20 which is comprised of time-division multiplexed microinstructions, each such microinstruction corresponding to the external data provided to either A or B sequencer 116, 120. Data section 4 of microprocessor 12 executes the microinstructions so as to control and/or communicate with interface devices 8 or other units 10.

Figure 2:
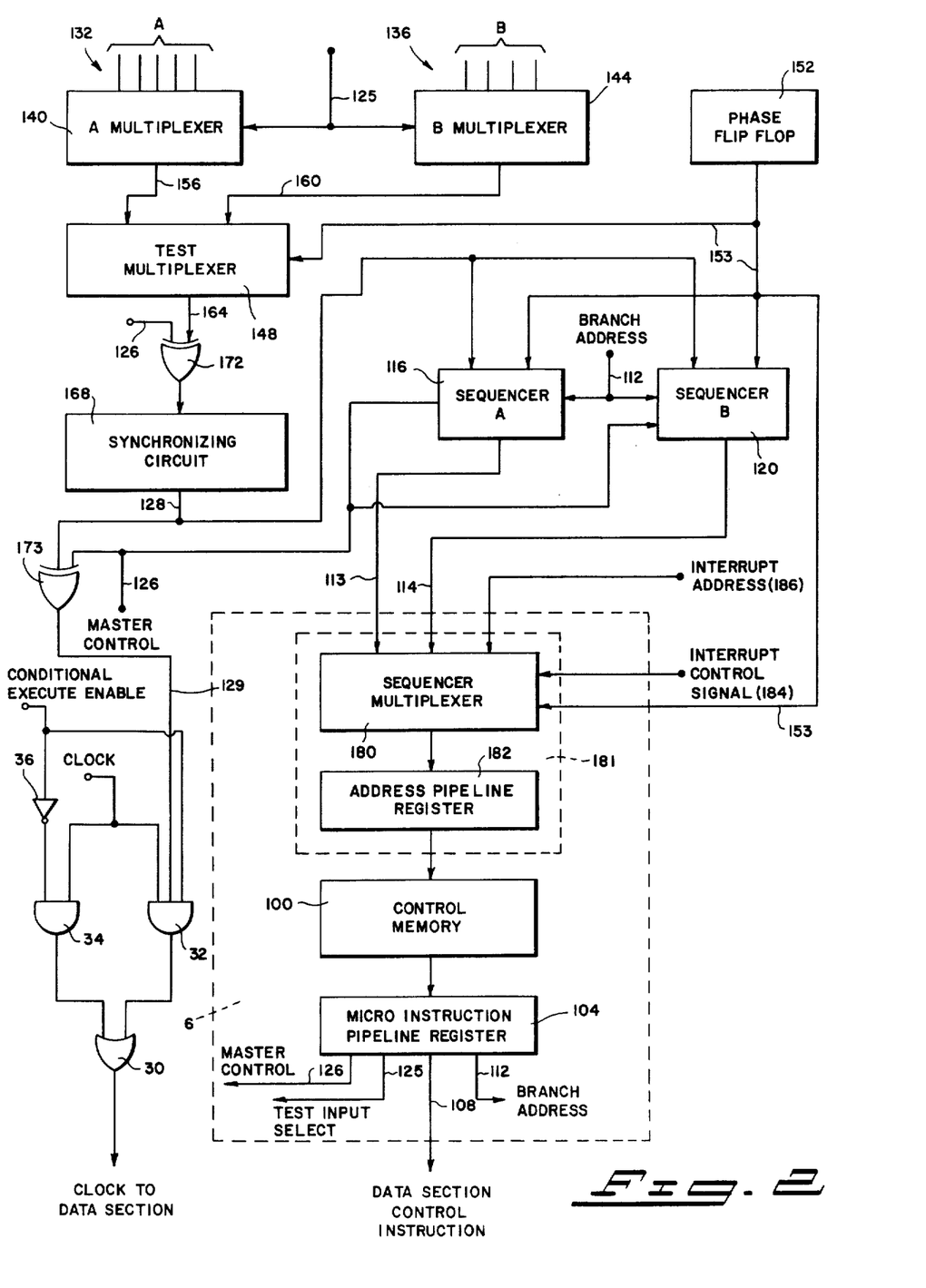
FIG. 2 is a block diagram of the control section of the present invention.

FIG. 2 shows in greater detail the components of the control section 2 of the dual sequencer microprocessor 12 of the present invention. The control section 2 provides the data control microinstructions, via bus 108, for the data section 4 of the microprocessor 12 in response to external data provided by inputs 132 and 136. It is important to note that the microprocessor 12 described herein is event driven rather than instruction driven. That is, the microprocessor 12 of the present invention responds to asynchronous input signals coming from external sources, each such source having its own signal lines 132, 136. This is to be contrasted to an instruction-oriented microprocessor which receives a previously coded sequence of synchronous macroinstructions, each of which it decodes and executes as a series of microinstructions.

In the present invention, two sets of asynchronous input signal lines exist, the A test inputs 132 and the B test inputs 136, although some lines may be common to both sets. The particular input line to the A multiplexer 140 or the B multiplexer 144 that is to be selected is controlled by the test input select 125. Once a test input line has been selected from the A multiplexer 140 or the B multiplexer 144, the data present in that line is linked to the test multiplexer 148 via line 156 or 160.

The bi-stable phase flip-flop 152 then selects which of the two test input lines 160, 156 will be further linked to the remainder of the control section 2. This phase flip-flop 152 also controls which of the two sequencers 116, 120 is selected, activating only the sequencer associated with the selected test input line. That is, during the "A" portion of the processing (i.e., one of two minor cycles comprising a microprocessor major cycle), only the A input line 156 to the test multiplexer 148 and the A sequencer 116 are active, while during the "B" minor cycle, only the B input line 160 to the test multiplexer 148 and the B sequencer 120 are active.

The output 164 of the test multiplexer 148 is coupled to an exclusive OR gate 172 so that the test input may be complemented under microprogram control. This complementation is controlled by a microinstruction control bit which is coupled to gate 172 by master control line 126 from instruction pipeline register 104. This ability to complement a test input allows for the use of both the true and false states of the test inputs 132 and 136.

Once the test input select lines 125 and the phase flip-flop 152, via line 153, have selected the desired individual A test input 132 or B test input 136 line that is to be monitored, and have coupled the desired input line through the exclusive OR gate 172 as described above, a synchronizing circuit 168 strobes the selected test input signal. Such strobing causes a stable logic signal test multiplexer output 128 to be presented to the currently active sequencer 116, 120, the signal being synchronized to the microprocessor clock, even when sampling asynchronous input signals. It is important that a stable synchronous test signal be available to the active sequencer 116, 120 in a minimum amount of time. If the test signal 132, 136 is not stable during the time a sequencer 116, 120 is generating a microinstruction address, faulty addresses may be generated. Thus, to ensure the rapid availability of such a stable signal, synchronizing circuit 168 strobes the selected test input signal early in the minor cycle of the applicable sequencer 116, 120. Circuits suitable for use in synchronizing circuit 168 are well known, some of which are disclosed in "Designing With TTL Integrated Circuits" (1971) by Morris and Miller at page 176.

As will be more fully described hereinbelow, after the selected test input is sampled, the sequencer 116, 120 activated by the phase flip-flop 152 uses the synchronizing circuit output 128 to generate a microinstruction address. This address is coupled to address processing means 6, which in the presently preferred embodiment is comprised of access means 181 (comprised of sequence multiplexer 180 and address pipeline register 182), control memory 100, and instruction pipeline register 104. The output of sequencers 116, 120 is fed via lines 113, 114 to the sequencer multiplexer 180. During normal operation multiplexer 180 is controlled, via line 153, by the phase flip-flop 152. The address generated by the selected sequencer 116, 120 is then fed into an address pipeline register 182 which, in turn, accesses the control memory 100. This address pipeline register 182 allows for the time-sharing of events so that address generation in one sequencer 116, 120 can be carried on simultaneously with the accessing of the control memory 100 by the microinstruction address previously generated by the other sequencer, due to the storage of the previously generated address in the address pipeline register 182.

The control of both the data section 4 and the control section 2 is governed by information, or microinstructions, stored in the control memory 100. In the presently preferred embodiment the control memory 100 is an integrated circuit random access readonly memory, although a variety of other memory elements may be used. The output of the control memory 100, generated in reponse to the address information provided it by register 182, is temporarily stored in the microinstruction pipeline register 104. The purpose of microinstruction pipeline register 104 is to allow for the time-sharing of events so that the accessing of a microinstruction in the control memory 104 can be carried on simultaneously with the execution by the microprocessor 12 of the microinstruction previously accessed and stored in the microinstruction pipeline register 104.

The output of the microinstruction pipeline register 104 contains four groups of signal lines 108, 112, 125, 126. One group of signal lines 108 is for the data section control microinstruction, which controls the functioning of the microprocessor data section 4. A second set of lines 112 are the branch address lines which are coupled to sequencers 116, 120. Lines 112 allow branching to diverse microinstruction locations, or addresses, within the control memory 100, as controlled by the A and B sequencers 116, 120. A third group of lines 125 is for the test input select, which governs the input to the sequencers 116, 120. The fourth group of signal lines 126 is for the master control signals, which control the operation of the sequencers 116, 120 and the two exclusive OR gates 172, 173.

Figure 3:
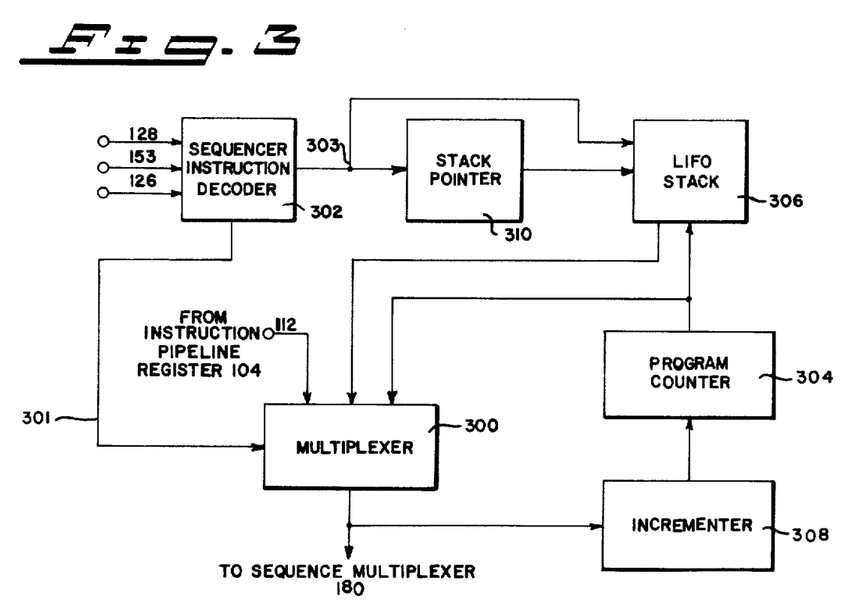
FIG. 3 is a block diagram of one sequencer of the control section of the present invention.

A and B sequencers 116, 120 are identical in their internal configuration, one such sequencer being illustrated in FIG. 3. The sequencer shown in FIG. 3 consists, in part, of a multiplexer 300 which selects, under program control by means of the multiplexer input 301 from the sequencer instruction decoder 302, one of three address sources for accessing a control memory 100 microinstruction. The three address sources selectable by the multiplexer 300 are the branch address 112, coming from the instruction pipeline register 104, the program counter 304, and a last-in-first-out (LIFO) memory stack 306.

The program counter 304 is the source of control memory 100 addressing for normal sequencing. Each address actually selected by the multiplexer 300 is incremented by one count by the incrementer 308 and stored in the program counter 304. Thus, if the multiplexer 300 selects the program counter 304 as an address source, a set of sequential addresses will be sent to the control memory 100, resulting in the accessing of sequentially addressed microinstructions.

If a jump or branch to another set of microinstructions is required, the multiplexer 300 selects the branch address 112 as the microinstruction address source. Typically, this new address then becomes the starting point for a new set of sequentially addressed microinstructions in the control memory 100, and thus the multiplexer 300 will switch back to the incremented program counter 304 for the very next address to be accessed.

If a microprogram requires a temporary branch to a new set of microinstructions, as in a subroutine, but a return to the original branching point is also desired so that the accessing of the previous set of microinstructions may continue, the multiplexer 300 selects the branch address 112 as the address source. In addition, the stack control output 303 of the sequencer instruction decoder 302 causes the last address in the program counter 304 to be stored in the LIFO stack 306. Information necessary to retrieve the address stored in the LIFO stack 306 is stored in stack pointer 310, also governed by the stack control output 303. Once the initial branch is made, typically the multiplexer 300 will select the incremented program counter 304 for the very next address to be accessed. When the set of microinstructions comprising the subroutine have all been accessed, and a return to the original branching point is required, the sequencer instruction decoder 302 causes the multiplexer 300 to select the LIFO stack 306 as its address source. Thereafter, normal sequencing is effected by the program counter 304. Since the LIFO stack 306 can typically store several addresses, jumps or branches to another subroutine may be made while the microprocessor is already in a different subroutine. This nesting ability often allows for highly efficient microprogramming of the microprocessor 12 of the present invention.

Which of the three sources the multiplexer 300 selects and the operation of the LIFO stack 306 and the stack pointer 310 are controlled by the output of the sequencer instruction decoder 302 whose input consists of the test jump operation control bits of the master control lines 126, the test multiplexer output 128 and the phase flip-flop line 153. The actual code inputs to the sequencer instruction decoder 302 of course depend upon the programming of the microprocessor. Not shown in FIG. 3 is the system clock, which is an input to all of the elements of the sequencer. Sequencer instruction decoder 302 can be one of numerous commercially available decoder devices, although the presently preferred embodiment implements the logic of such devices integrally with the other components of the sequencer 116, 120. Sequencer instruction decoder 302 can be configured or "programmed" in a variety of well known ways so as to bring about control of stack pointer 310, LIFO stack 306 and multiplexer 300 as described hereinabove.

Figure 4A:
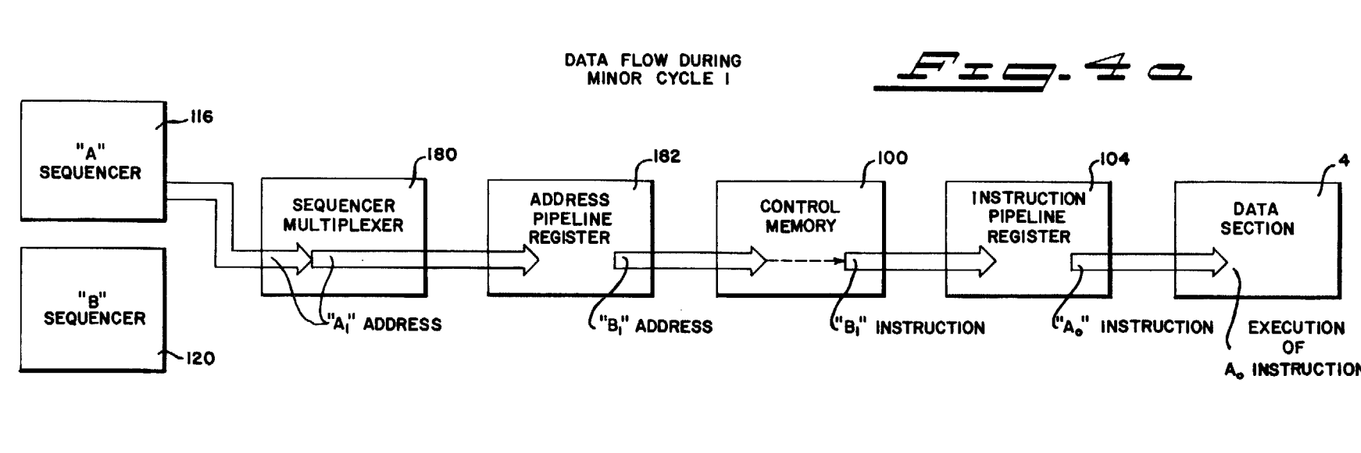
FIG. 4a is an illustration of the data flow through the control section of the present invention during minor cycle 1.

FIG. 4 illustrates typical data flow through the microprocessor control section 2 of the present invention. The microprocessor major cycle utilized in control section 2 is divided into two minor cycles, minor cycles 1 and 2. FIG. 4a illustrates the data flow during one typical minor cycle in microprocessor control section 2. It can be seen from FIG. 4a that the A sequencer 116 generates an address denoted "$A_1$" which is passed through sequencer multiplexer 180 and made available to address pipeline register 182. At the end of minor cycle 1, $A_1$ will be temporarily stored in address pipeline register 182 for use during minor cycle 2.

During the same general time frame in which the A sequencer 116 is passing address $A_1$ to address pipeline register 182, the $B_1$ address information, which had been stored in address pipeline register 182 during the immediately preceding minor cycle, is made available to control memory 100. In response to the receipt of the $B_1$ address from address pipeline register 182, control memory 100 generates a $B_1$ instruction, corresponding to the $B_1$ address and, at the end of minor cycle 1, places this instruction in instruction pipeline register 104. This $B_1$ instruction is temporarily stored in instruction pipeline register 104 until it is used during the next minor cycle. Also during minor cycle 1, the $A_0$ instruction, which was stored in instruction pipeline register 104 during the immediately preceding minor cycle, is made available by control section 2 to data section 4 of the microprocessor 12. Data section 4 then executes instruction $A_0$.

Figure 4B:
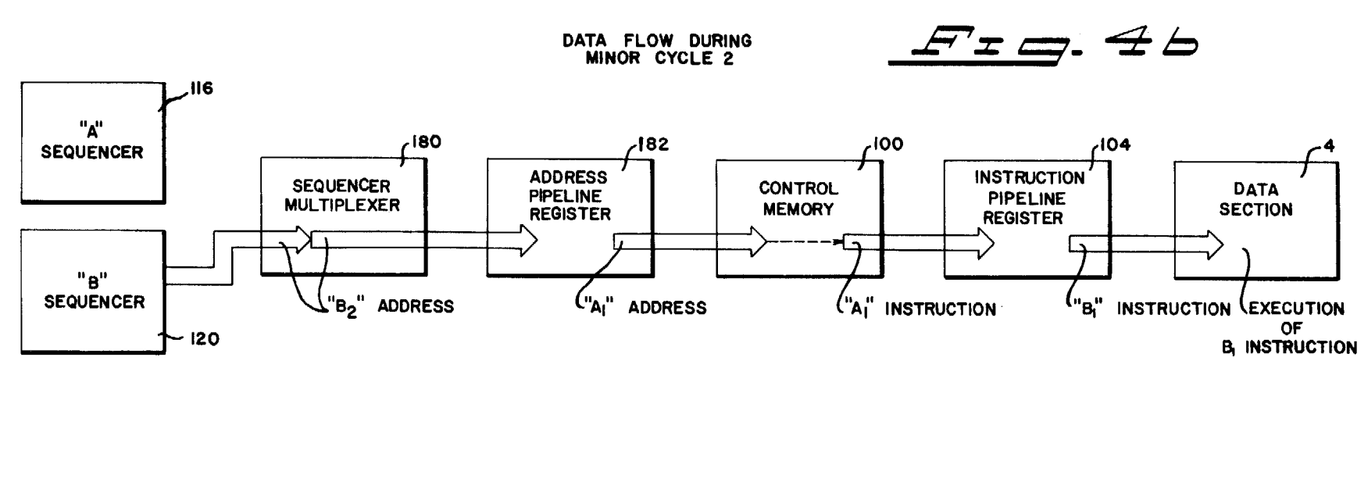
FIG. 4b is an illustration of the data flow through the control section of the present invention during minor cycle 2.

FIG. 4b illustrates the data flow through microprocessor control section 2 of the present invention during minor cycle 2, immediately following the minor cycle data flow illustrated in FIG. 4a. B sequencer 120 generates a "$B_2$" address which is transferred to sequencer multiplexer 180 and forwarded to address pipeline register 182. The $B_2$ address is temporarily stored in address pipeline register 182 at the end of minor cycle 1 so that it is available for use in the next minor cycle. Also during minor cycle 2, the $A_1$ address which was stored in address pipeline register 182 at the end of minor cycle 1 (FIG. 4a) is made available to control memory 100. In response to the $A_1$ address from address pipeline register 182, control memory 100 generates an $A_1$ instruction, which corresponds to the $A_1$ address, and at the end of minor cycle 2 transfers this instruction to instruction pipeline register 104. The $A_1$ instruction is temporarily stored in instruction pipeline register 104 so that it is available for use in the next minor cycle.

Also during minor cycle 2, the $B_1$ instruction which was temporarily stored in instruction pipeline register 104 at the end of minor cycle 1 (FIG. 4a) is made available by microprocessor control section 2 to data section 4. Data section 4 then executes the $B_1$ instruction. The general data flow illustrated in FIGS. 4a and 4b continues in subsequent minor cycles in a like manner.

As can be seen from the data flow shown in FIG. 4, the address pipeline register 182 serves the very important role of establishing the proper phasing among the functions of address generation and control memory accessing. The interleaving of these two functions allows each an entire minor cycle to be used for address generation and control memory accessing. In a conventionally organized microprocessor, address generation and control memory accessing must be done, for maximum efficiency, in the same time that it takes the data section to execute the previous microinstruction. Hence, a very fast and thus expensive control memory would be needed if the conventional organization were used in the present invention. Alternatively, a longer time could be allowed for address generation and control memory accessing, but this would result in a slower device. The present invention, because of the interleaving of address generation and control memory accessing allowed by having dual sequencers 116, 120 and the utilization of address pipeline register 182 provides a minor cycle time which is less than the cycle time achieved in a conventionally organized microprocessor.

FIGS. 2 and 3 further illustrate that the present invention includes an interrupt capability which permits the rapid control of one or both of the microprograms and their associated sequencers 116, 120 by means of external control signals. The interrupt control signal 184 coupled to sequencer multiplexer 180 may be enabled or disabled by each individual microinstruction. This capability is required in order to synchronize an interrupt signal with a microprogram so that input flag signals from the data section 4 to the processor are not lost when an interrupt occurs. In addition, the interrupt control signal 184 is synchronized with the timing of the processor 12 as a whole. When the interrupt control signal 184 is enabled and active, it prevents the gating of the outputs of A sequencer 116 and/or B sequencer 120 through the sequencer multiplexer 180, and instead feeds a wholly or partially hardwired interrupt address through the sequencer multiplexer 180, via line 186, and into the address pipeline register 182. Since the interrupt address on line 186 need not be wholly hardwired, vectored branching in the control memory 100 may be accomplished by the appropriate coding of part of the interrupt address.

During the minor cycle in which an interrupt address is fed to the address pipeline register 182, the currently active sequencer 116, 120 performs its normal operation except that the sequencer-generated address placed into the program counter 304 will not have been incremented (see FIG. 3). Since the address generated by the active sequencer 116, 120 is not placed in the address pipeline register 182 and thus will not be accessed in the next minor cycle, this non-incremented address must be stored and returned to after the interrupt routine has been completed. Therefore, the first microinstruction of the interrupt routine performs a JUMP TO SUBROUTINE operation, causing the contents of the program counter 304, which is the unaccessed memory address, to be placed on the LIFO stack 306. This allows a RETURN microinstruction at the end of the interrupt routine to return to that unaccessed memory address and complete the interrupted microprogram.

FIG. 2 also illustrates another feature of the present invention, the conditional execute. The conditional execute feature uses the test multiplexer output 128 of the synchronizing circuit 168 to directly control the operation of the data section 4. This is accomplished by enabling and disabling the clock signal that drives the data section 4. When the conditional execute is enabled, the clock, and hence the data section 4, is disabled until an external event occurs (or stops occurring). The synchronizing circuit 168 strobes the external test line early in the current minor cycle and upon the occurrence (or non-occurance) of the expected external event, line 128 provides an input to an exclusive OR gate 173. This gate allows the output of the synchronizing circuit 168 to be complemented by a complement control bit of the master control lines 126, independently of the signal sent on line 128 to the sequencers 116, 120.

Assuming the conditional execute enable signal is present, that signal will also provide a high input to AND gate 32. Thus, the clock signal will be passed through AND gate 32 as well as OR gate so as to be provided to the data section 4. When the external expected event has not occurred, sampling circuit 168 via line 128 and exclusive OR gate 173, via line 129, presents a low signal to AND gate 32 so that the clock is prevented from being coupled to data section 4. On the other hand, when the conditional execute enable signal is not present, that signal will be inverted by inverter 36 and a high signal is provided to AND gate 34 so that the clock signal is passed through gate 34 and gate 30 so as to be continuously available to the data section 4.

With the conditional execute, therefore, it is possible to construct a software microprogram that repeatedly loops to the same microinstruction in the absence of an external event, so that when the external event occurs the data section 4 will execute the control instruction portion of the microinstruction which, because of the self-looping, appears to always reside in the instruction pipeline register 104. Thereafter, normal sequencing occurs. An advantage of this structure is that the latency period between the occurrence of the external event and data section 4 execution is reduced to a minimum. Further, space in the control memory 100 is conserved since the instruction to be executed upon the occurrence of the external event also controls the self-looping, whereas a more typical microprocessor configuration requires both a looping instruction and an execution instruction to be accessed sequentially. The conditional execute feature of the present invention may be also used in conjunction with a typical single-sequencer microprocessor. In such a configuration, the conditional execute functions identically to its operation in a dual sequencer microprocessor except that the delay from the occurrence of the resulting data section 4 execution is never more than one processor cycle.

Since the external test line is sampled early in a minor cycle, in the present invention having dual sequencers 116, 120, the delay from the occurrence of the expected external condition to the resulting data section 4 execution is a minimum of one minor cycle and a maximum of three minor cycles. The maximum delay is due to the fact that if the external event occurs just after the sampling strobe, the remainder of that minor cycle and all of the next minor cycle, which belongs to the other sequencer 116, 120 must be passed before another strobe occurs in the original sequencer 116, 120. The minimum delay arises when the occurrence of the external event happens within the sampling strobe of the sequencer 116, 120 that is expecting the event.

As can be seen from the above description, one important feature of the present invention lies in the fact that there are two independent sequencers 116, 120 rather than the single sequencer found in a typical microprocessor. This dual sequencer configuration allows the microprocessor to handle two realtime tasks by time-division multiplexing between the two sequencers 116, 120, each of which executes its own independent microprogram in the single time-shared data section. An advantageous result of this configuration is that each program has full subroutine capability. Thus, one important advantage of the present invention arises in those applications where the bandwidth of a single data section processor is sufficient to handle two processing tasks, but where the economics of the situation does not justify two separate microprocessors, each with its own data section. The present invention provides a control section mechanism which allows a single data section of one microprocessor to handle two separate tasks, with efficiency, convenience, and economy.

There has been described herein a new and novel microprocessor control section. While a specific embodiment of the present invention has been disclosed and described in detail herein, it will be understood by those skilled in the art that various changes in form and detail may be made therein without departing from the spirit and scope of the invention.

We claim:

1. A control section for use in a microprocessor having a control section containing microinstructions for two independent microprograms and a data section, comprising:
  (i) first and second sequencer means, each having an output bus and at least one input bus, each said sequencer means for generating for a corresponding microprogram an address signal in response to external data received on said at least one input bus and for providing said address signal on said output bus, wherein said first and second sequencer means generate address signals during alternating time periods; and
  (ii) address processing means, having a first input bus coupled to the output bus of said first sequencer means, a second input bus coupled to the output bus of said second sequencer means, and an instruction output bus coupled to said data section, said address processing means for subsequently converting each previously generated address signal into a microinstruction for the corresponding microprogram, and for making each said microinstruction available on said instruction output bus subsequent to said conversion, for execution by said data section,
  wherein each of the sequencer means generates a new address signal for the corresponding microprogram during the time period in which the microinstruction corresponding to the previous address signal generated by that sequencer means is made available for execution, thereby resulting in the most efficient use of said address processing means and said data section.

2. The microprocessor control section of claim 1 wherein said address processing means is comprised of:
  (i) a control memory having microinstructions stored therein and a plurality of output buses coupled thereto; and
  (ii) access means, coupled to said control memory and having two input buses, for controlling said control memory whereby said microinstructions are provided at one said output bus of said control memory in response to said address signals alternately provided at said input buses of said access means.

3. The microprocessor control section of claim 2 wherein said access means is comprised of:
  (i) a multiplexer having two input buses; and
  (ii) an address register coupled to said multiplexer and to said control memory whereby said address signals provided at said input buses of said multiplexer are alternately coupled to said address register where each said signal is temporarily stored and thereafter coupled to said control memory.

4. The microprocessor control section of claims 2 or 3 wherein said address processing means further comprises an instruction memory coupled to one said output bus of said control memory, said instruction memory having an output bus coupled to said data section and adapted to temporarily store microinstructions from said control memory while said access means is controlling said control memory.

5. The microprocessor control section of claim 4 wherein said instruction memory is a register.

6. The microprocessor control section of claim 1 wherein each said sequencer means comprises a multiplexer having a plurality of address input buses and one output bus, said multiplexer output bus being coupled to said address processing means and being selectively coupled to one of said address input buses by said multiplexer.

7. The microprocessor control section of claim 6 wherein each said sequencer means further comprises an incrementer means coupled to said output bus of said multiplexer and to one said address input bus of said multiplexer for incrementing by an integer the value of the address signal present at said output bus of said multiplexer and providing the value of the address signal incremented by an integer to said address input bus of said multiplexer.

8. The microprocessor control section of claim 7 wherein said address processing means further comprises an address output bus having a signal thereon indicative of the address signal corresponding to each said microinstruction present on said instruction output bus, and said sequencer further comprising feedback means coupled to said address output bus of said address processing means and one said address input bus of said multiplexer for coupling said signal from said address output bus to said one address input bus of said multiplexer.

9. The microprocessor control section of claim 8 wherein said sequencer further comprises a storage means coupled to said incrementer means and to one said address input bus of said multiplexer for storing the most current address signal from said incrementer means and providing said address signal to said multiplexer.

10. The microprocessor control section of claim 1 wherein said address processing means further comprises an interrupt input bus coupled to an interrupt address source, and further comprising an interrupt control means for controlling said address processing means such that upon actuation of said interrupt control means, said address processing means is not responsive to said address signals provided at said first and second input buses but provides microinstructions at said output bus corresponding to address information provided by said interrupt address source to said interrupt input bus.

11. The microprocessor control section of claim 10 wherein said address processing means further comprises:
  (i) a control memory having microinstructions stored therein and a plurality of output buses coupled thereto; and
  (ii) an address register coupled to said control memory, and wherein said interrupt control means is comprised of a multiplexer having first and second input buses, an interrupt control line and an interrupt input bus, said multiplexer adapted such that upon the deactivation of said interrupt control line, address signals provided at said input buses of said multiplexer by said first and second sequencer means are alternately coupled to said address register where each said signal is temporarily stored and thereafter coupled to said control memory, and, upon the activation of said interrupt control line, address information provided at said interrupt input bus of said multiplexer is coupled to said address register where said information is temporarily stored and thereafter coupled to said control memory.

12. A microprocessor control section for use in a microprocessor having a control section containing microinstructions for two independent microprograms and a data section, comprising:
  (i) two sequencer means, each for receiving data from at least one independent source and generating for a corresponding microprogram address information responsive to said data, wherein said sequencer means generate said address information during alternating time periods;
  (ii) a sequencer multiplexer coupled to both said sequencer means;
  (iii) an address memory coupled to said multiplexer;
  (iv) a control memory coupled to said address memory, said control memory have microinstructions for both of said microprograms stored therein and an output bus, whereby said sequencer multiplexer alternately couples each said sequencer means to said address memory so that address information provided by each said sequencer means is temporarily stored in and then output from said address memory, and whereby said control memory, subsequent to the generation of said address information, generates a microinstruction on said output bus of said control memory corresponding to said address information; and
  (v) an instruction memory coupled to said output bus of said control memory, having an instruction output bus coupled to said data section, and adapted to temporarily store each said microinstruction for said control memory and to make each said microinstruction available to said data section for execution, wherein each said microinstruction is stored subsequent to the generation of said microinstruction,
wherein each of the sequencer means generates new address information for the corresponding microprogram during the time period in which the microinstruction corresponding to the previous address information generated by that sequencer means is made available for execution, thereby resulting in the most efficient use of said address processing means and said data section.

13. The microprocessor control section of claim 12 wherein said address memory is a register.

14. The microprocessor control section of claim 13 wherein each said sequencer means comprises a control multiplexer having a plurality of input buses and one output bus, said output bus being coupled to said sequencer multiplexer and being selectively coupled to one of said input buses by said control multiplexer.

15. The microprocessor control section of claim 12 wherein said instruction memory is a register.

16. The microprocessor control section of claim 15 wherein each said sequencer means comprises a control multiplexer having a plurality of input buses and one output bus, said output bus being coupled to said sequencer multiplexer and being selectively coupled to one of said input buses by said control multiplexer.

17. The microprocessor control section of claim 12 wherein each said sequencer means comprises a control multiplexer having a plurality of input buses and one output bus, said output bus being coupled to said sequencer multiplexer and being selectively coupled to one of said input buses by said control multiplexer.

18. The microprocessor control section of claim 17 wherein each said sequencer means further comprises an incrementer means coupled to said output bus of said control multiplexer and to one said input bus of said control multiplexer for incrementing by an integer the value of the address information present at said output bus of said control multiplexer and providing the value of the address information incremented by an integer to said one input bus of said control multiplexer.

19. The microprocessor control section of claim 18 wherein said instruction memory has an output bus and a signal bus, said signal bus having a signal thereon indicative of the address information corresponding to each said microinstruction present on said output bus, and said sequencer further comprising feedback means coupled to said signal bus of said instruction memory and one said input bus of said control multiplexer for coupling said signal from said signal bus to said input bus of said control multiplexer.

20. The microprocessor control section of claim 19 wherein said sequencer further comprises a storage means coupled to said incrementer means and to one said input bus of said control multiplexer for storing the most current address information from said incrementer means and providing said address information to said control multiplexer.

21. The microprocessor control section of claim 12 further comprising:
  (a) a microinstruction looping means for selectively causing said control section to repeatedly generate a selected microinstruction and repeatedly store said microinstruction in said instruction memory until a certain external data input is received from one said independent source, and thereafter allowing said control section to generate other microinstructions; and
  (b) conditional execute means coupled to a clock signal, for controlling the output of said clock signal to said data section, said conditional execute means coupled to both said sequencer means so as to receive said data from one said independent source, and adapted to output said clock signal upon the receipt of said certain data and to not output said clock signal without the receipt of said certain data.

22. A control section for use in a microprocessor having a control section containing microinstructions for two independent microprograms and a data section, comprising:
  (i) first and second sequencer means, each having an output bus and at least one input bus, each said sequencer means for generating for a corresponding microprogram an address signal in response to external data received on said at least one input bus and for providing said address signal on said output bus, wherein said first and second sequencer means generate address signals during alternating time periods; and
  (ii) address processing means, having a first input bus coupled to the output bus of said first sequencer means, a second input bus coupled to the output bus of said second sequencer means, and an instruction output bus coupled to said data section, said address processing means for subsequently converting each previously generated address signal into a corresponding microinstruction, and for making each said microinstruction available on said instruction output bus subsequent to said conversion for execution by said data section, wherein each of the sequencer means generates a new address signal for the corresponding microprogram during the time period in which the microinstruction corresponding to the previous address signal generated by that sequencer means is made available for execution, and wherein said address processing means further comprises an interrupt input bus coupled to an interrupt address source, and further comprising an interrupt control means for controlling said address processing means such that upon actuation of said interrupt control means, said address processing means is not responsive to said address signal provided at said first and second input buses but provides microinstructions at said instruction output bus corresponding to address information provided by said interrupt address source to said interrupt input bus.

23. The microprocessor control section of claim 22 wherein said address processing means further comprises:

(i) a control memory having microinstructions for both of said microprograms stored therein and a plurality of output lines coupled thereto; and (ii) an address register coupled to said control memory, and wherein said interrupt control means is comprised of a multiplexer having a first input bus coupled to said output bus of said first sequencer means and a second input bus coupled to said output bus of said second sequencer means, an interrupt control line and an interrupt input bus, said multiplexer adapted such that upon the deactivation of said interrupt control line, address signals provided at said input buses of said multiplexer are alternately coupled to said address register where each said signal is temporarily stored and thereafter coupled to said control memory, and, upon the activation of said interrupt control line, address information provided at said interrupt input bus of said multiplexer is coupled to said address register where said information is temporarily stored and thereafter coupled to said control memory.

24. A microprocessor control section for use in a microprocessor to control the interleaved execution of two independent microprograms, said microprocessor having a control section and having a data section which executes independent instructions during individual time periods, comprising:

(i) two sequencer means, for respectively generating during alternate time periods address information in response to data received from respective independent sources;

(ii) a control memory storing the instructions for both of said two microprograms;

(iii) an address register;

(iv) sequencer multiplexer means for alternately coupling each sequencer means to said address register so that address information provided by one then the other of said sequencer means is alternately supplied to and stored in said address register during corresponding alternate time periods, said address register outputting to the control memory during each subsequent time period the address supplied to said address register by said multiplexing means during the preceding time period, said control memory in response to each address providing an instruction for the corresponding microprogram as an output; and (v) instruction register means, coupled to said control memory, for temporarily storing for one time period each instruction supplied from said control memory and for supplying the instruction to said data section for execution by said data section during the same time period that a respective one of said sequencer means is generating the next address information for the corresponding microprogram;

whereby the instructions of said two microprograms are executed in an interleaved manner with address generation for each sequencer overlapping execution of an instruction corresponding to an address previously generated by said sequencer.

25. In a microprocessor having a control memory containing instructions for two independent microprograms, and having a data section in which the instructions of said independent microprograms are executed during alternate time periods, a control section comprising:

(i) address generation means for supplying respective instruction addresses for the two microprograms during respective alternate time periods;

(ii) pipelined address means, interconnecting said address generation means and said control memory, for accesssing from the control memory during one time period the instructions specified by the address supplied during the preceding time period; and (iii) pipelined instruction means, interconnecting said control memory and said data section, for supplying to said data section during the next successive time period, for execution thereby, the instruction accessed from the control memory during said one time period;

whereby during each time period the data section executes an instruction of one microprogram, while concurrently the address of the next instruction of said one microprogram is supplied by said address generating means, and while concurrently the next instruction of the other microprogram is accessed from the control memory.

26. In a microprocessor having a control section and a data section, said data section being configured to execute an instruction supplied thereto from said control section so long as a clock signal is concurrently supplied to said data section, said control section being coupled to at least one source of data external to the microprocessor, said control section having at least one input for receiving input data and an output coupled to said data section, said control section generating microinstructions in response to input data and temporarily providing each said microinstruction to said data section for possible execution thereby, the improvement comprising:

(i) in the control section, a microinstruction looping means for selectively causing said control section to repeatedly generate the same microinstruction by branching repeatedly to the address of said same microinstruction, while concurrently inhibiting the supply of said clock signal to said data section so that said repeatedly generated same microinstruction is not executed; and (ii) a conditional execute means for controlling the supply of said clock signal to said data section, said conditional execute means being coupled to said data section and receiving data from said at least one external source, said conditional execute means causing said clock signal to be provided to said data section only upon the receipt of said certain data at said conditional input, thereby enabling said data section immediately to execute said same microinstruction then provided by said control section.

* * * * *